(12) United States Patent
Anschutz et al.

(10) Patent No.: US 8,055,770 B2
(45) Date of Patent: Nov. 8, 2011

(54) METHOD AND APPARATUS FOR PROVIDING NETWORK VIRTUALIZATION

(75) Inventors: Thomas Anschutz, Conyers, GA (US); Alan Blackburn, Woodstock, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 266 days.

(21) Appl. No.: 12/335,159

(22) Filed: Dec. 15, 2008

(65) Prior Publication Data
US 2010/0153554 A1    Jun. 17, 2010

(51) Int. Cl.
*G06F 13/00* (2006.01)
(52) U.S. Cl. ............ 709/225; 709/219; 709/229
(58) Field of Classification Search ............ 709/217, 709/219, 220, 223, 225, 227, 229; 718/1
See application file for complete search history.

(56) References Cited

U.S. PATENT DOCUMENTS

| | | | | |
|---|---|---|---|---|
| 7,093,005 | B2 * | 8/2006 | Patterson | 709/220 |
| 7,426,580 | B2 * | 9/2008 | Monga et al. | 709/250 |
| 7,523,187 | B1 * | 4/2009 | Lavallee et al. | 709/223 |
| 2004/0210623 | A1 * | 10/2004 | Hydrie et al. | 709/201 |

* cited by examiner

*Primary Examiner* — Viet Vu

(57) ABSTRACT

A method and apparatus for providing network virtualization on a packet network are disclosed. For example, the method receives a request from a user, wherein the request comprises at least one of: a feature of a network component or a network component for a virtual network. The method determines if the request can be instantiated over one or more real network resources, and then instantiates the request via the one or more real network resources, if it is determined that the request can be instantiated.

14 Claims, 4 Drawing Sheets

METHOD AND APPARATUS FOR PROVIDING NETWORK VIRTUALIZATION

The present invention relates generally to communication networks and, more particularly, to a method and apparatus for providing network virtualization on a packet network, e.g., an Internet Protocol (IP) network, Virtual Private Network (VPN), and the like.

BACKGROUND OF THE INVENTION

An enterprise customer may build a Virtual Private Network (VPN) by connecting multiple sites or users over a network from a network service provider. For example, an enterprise customer may build a VPN to enable its employees and suppliers to access data and communicate among each other regardless of the users' physical location. The VPN functions on the data plane to enable packets to be forwarded to a network unique to the enterprise customer. For example, a virtual route forwarding table may be implemented in a provider edge device to forward packets to a particular enterprise customer's VPN. However, the control plane and management plane operate on the real network as opposed to the virtual network. That is, the virtualization of a VPN is limited to forwarding functions and does not include the management and control functions. For example, Border Gateway Protocol (BGP) and Open Shortest Path First (OSPF) protocols operate on the entire control plane that may encompass any number of virtual networks.

SUMMARY OF THE INVENTION

In one embodiment, the present invention discloses a method and apparatus for providing network virtualization on a packet network. For example, the method receives a request from a user, wherein the request comprises at least one of: a feature of a network component or a network component for a virtual network. The method determines if the request can be instantiated over one or more real network resources, and then instantiates the request via the one or more real network resources, if it is determined that the request can be instantiated.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing network virtualization on a packet network. Although the present invention is discussed below in the context of virtual private networks, the present invention is not so limited. Namely, the present invention can be applied for other networks that may benefit from virtualization, e.g., cellular networks and the like.

Figure 1:
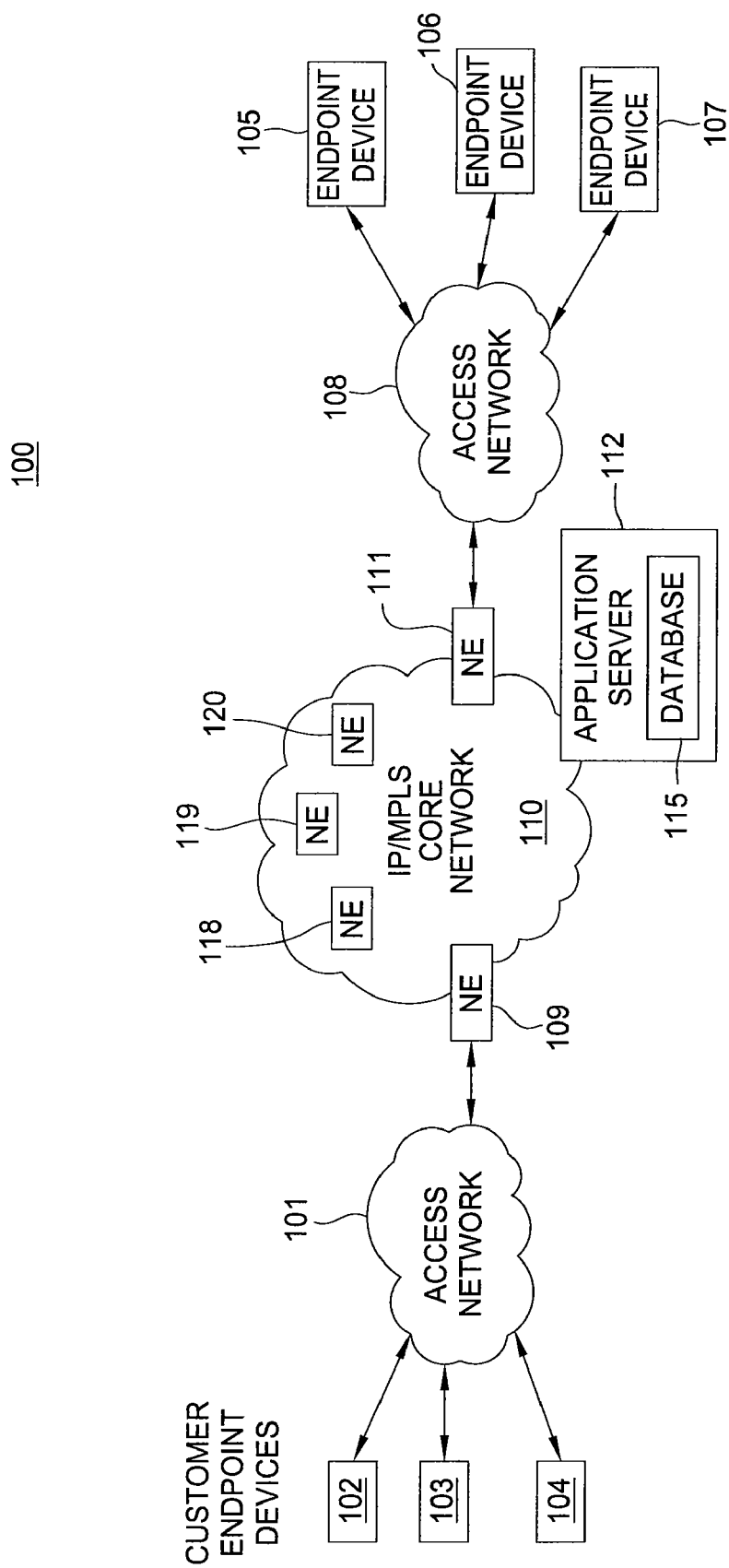
FIG. 1 illustrates an illustrative network related to the present invention.

FIG. 1 is a block diagram depicting an exemplary packet network 100 related to the current invention. Exemplary packet networks include Internet protocol (IP) networks, Ethernet networks, and the like. An IP network is broadly defined as a network that uses Internet Protocol such as IPv4 or IPv6 and the like to exchange data packets.

In one embodiment, the packet network may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IP/MPLS core network 110, or indirectly through another network.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, honeypot, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, and so on are depicted in FIG. 1, the communication system 100 may be expanded by including additional endpoint devices, access networks, network elements, and application servers without altering the scope of the present invention.

The above IP network is described to provide an illustrative environment in which packets for voice, data, and multimedia services are transmitted on networks. In one embodiment, an enterprise customer may build a Virtual Private Network (VPN) by connecting multiple sites or users over a service provider's network as illustrated in FIG. 1. For example, an enterprise customer may build a VPN to enable communication among users in multiple geographical areas. The VPN enables the network to forward packets destined to the enterprise customer using a Virtual Route Forwarding (VRF) table specific to the customer. However, the control plane and management plane operate over the entire network that may include several virtual networks. That is, unlike the VRF, the control plane protocols, e.g., Border Gateway Protocol (BGP) and Open Shortest Path First (OSPF), are not customer specific and apply to the entire network. The management functions, e.g., element management, customer management, etc., also operate on the entire network.

In one embodiment, the present invention discloses a method and apparatus for providing network virtualization. The network virtualization of the current invention would allow managing and controlling the network at the virtual network layer. In order to clearly describe the current invention, the following networking terminology are first provided:

A Virtual Private Network (VPN);
Data/forwarding plane;
Control plane; and
Management plane.

A Virtual Private Network (VPN) refers to a network in which a set of customer locations communicate over a provider's network or the Internet in a private manner. The set of customer locations that may communicate with each other over the VPN are configured when the VPN is set up. That is, locations outside of the VPN are not allowed to intercept packets from the VPN or send packets over the VPN.

A routing architecture is structured in layers and planes. For example, IP networks may have three planes: data/forwarding, control and management planes. The layer structure refers to a 7 layer Open Systems Interconnection (OSI) model, known as OSI stack.

Data/forwarding plane (broadly referred to as a data plane) refers to a protocol used to move data hop-to-hop towards its destination. For example, a router looks up the destination address provided in an incoming packet's header, and retrieves information telling it the outgoing interface to which the router should forward the data. For example, the router may use a Virtual Route Forwarding (VRF) table to determine the outgoing interface for a particular VPN customer traffic.

The control plane refers to a network plane used for signaling and messaging to control connections, disseminate connectivity related information, determine optimal paths between routers, etc. For example, OSPF is used in the control plane to determine optimal paths.

The management plane refers to a logical plane containing all paths for all traffic related to the management of a network. These capabilities are often categorized as FCAPS, or Fault, Configuration, Accounting, Performance, Security. While not part of the acronym, it also typically includes Administration. The management plane may be instantiated in methods typical of operations systems or alternately in methods that use policies to set and evaluate interactions. The management plane is used to manage each network element through its connection to the network. For example, an element management system may use a network management protocol, e.g., Simple Network Management Protocol (SNMP), Telnet, COPS, RADIUS, etc. to interact with a network element and manage it. The management plane also coordinates functions among the three planes.

In order to perform the data/forwarding plane operations, a VPN site has one or more Customer Edge (CE) routers attached to one or more Provider Edge (PE) routers. Each PE router attached to a CE router maintains a Virtual Route Forwarding (VRF) table for the VPN and forwards traffic among various VPN sites using the VRF table.

Figure 2:
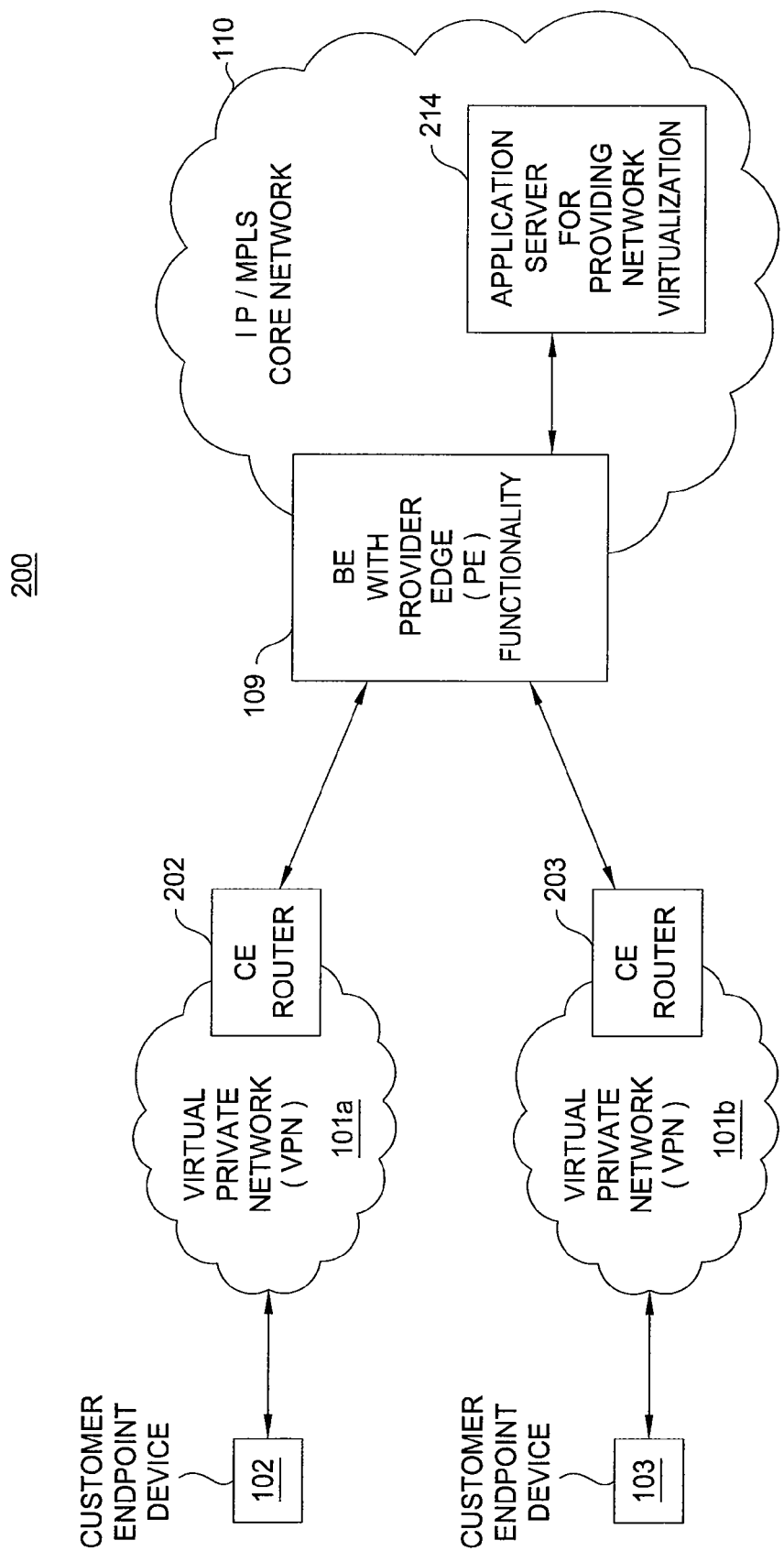
FIG. 2 illustrates an illustrative network with network virtualization.

FIG. 2 provides an exemplary network 200 with network virtualization. The illustrative network 200 comprises customer endpoint devices 102 and 103, VPN networks 101*a* and 101*b*, and an IP/MPLS core network 110. The VPNs 101*a* and 101*b* provide CE functionality in routers 202 and 203, respectively. The CE routers 202 and 203 are connected to the IP/MPLS core network 110 through a border element with Provider Edge (PE) router functionality 109. The IP/MPLS core network 110 also contains an application server 214 for providing network virtualization.

Packets from customer endpoint device 102 towards the IP/MPLS core network 110 will traverse the VPN 101*a*, CE router 202 and PE router 109. Packets from customer endpoint device 103 towards the IP/MPLS core network 110 will traverse VPN 101*b*, CE router 203 and PE router 109. Packets destined to the customer endpoint device 102 will traverse the PE router 109 towards CE router 202. CE router 202 then forwards the packets to the customer endpoint device 102 via the VPN 101*a*. Similarly, packets destined to the customer endpoint device 103 traverse the PE router 109 towards CE router 203. CE router 203 then forwards the packets to the customer endpoint device 103 via the VPN 101*b*.

In one embodiment, the service provider may create a database containing various network devices whose features are to be emulated. In other words, the features for the network devices will be emulated over real networks. For example, the service provider may emulate features on older routers it may no longer have in its own network.

For example, a customer may still have certain features from the older routers he/she may wish to continue receiving. The customer may also have a management platform and expertise for the older routers. The service provider may then emulate the features from the older routers over the real network, thereby creating a virtualized network element for the customer spanning the data, control and management planes. For example, the customer may use familiar SNMP commands for the older routers for managing the virtualized network. In turn, the application server 214 provides the virtualization functions including any necessary translation of management and control commands/messages. In a similar manner, the service provide may emulate connections between one or more of these routers, thereby creating virtualized trunk elements for the customer. In other words, the present invention also contemplates the emulation of links and/or trunks that connect the various network devices. For example, the customer may instruct the serving network to establish a Gigabit Ethernet connection between two of their virtual routers and the network virtualization software creates a data link between the two entities using capacity of a real network that may be Ethernet-based or other.

In one embodiment of the present invention, a customer is provided with a user interface for designing a virtual network. In one example, the customer uses realistic network components, e.g., switches, routers, links, trunks, etc., and pins the network components to a network topology to design the virtual network. The customer may then provide the designed virtual network to the application server 214 in the service provider's network. In another example, the customer may simply provide a list of features, with or without network components.

It should be noted that the present invention provides the customer with the unique experience of interacting with the virtual network as if the virtual network is a real network. In other words, the customer is provided with a customer interface that illustrates the various elements of the virtual network instantiated as real elements of a real network.

In one embodiment, the application server 214 then receives the customer's request and instantiates the features of the virtual network on real network resources (broadly including but not limited to routers, switches, links, trunks, application servers, and the like). For example, the service provider's network may not have a particular type of router that a customer has used in designing the virtual network, but may be able to emulate the features of the router using one or more other routers in the service provider's network. The customer may then perform configuration and management using commands for the virtual network. That is, the method enables the virtual network to be instantiated on the real network and allows the virtual network to be manipulated as if it is real. For example, a router A that exists only in the virtual network may be instantiated on a router B in a real network. In fact, router B in the real network may emulate several virtual routers including router A provided router B has sufficient processing capability to emulate multiple virtual routers. The customer may then configure, remove, and/or re-locate the virtual router (e.g., virtual router A) as if the router truly exists in the real world.

In one embodiment, the service provider enables the customer/user to pin the network components and/or links and trunks to a topology in the real world (e.g., real locations such as a town, a borough, a city, a county, a state, a region of the country and so on). For example, a network designer may pin the network components to locations where known fiber optic cables and switches are located.

In one embodiment, the service provider enables the customer/user to pin the network components and/or links and trunks to a topology in cyberspace. For example, the method may enable the customer to design the virtual network with no restriction. The link between the real world topology and cyberspace topology may be provided as part of the current method for providing network virtualization, or separately.

Figure 3:
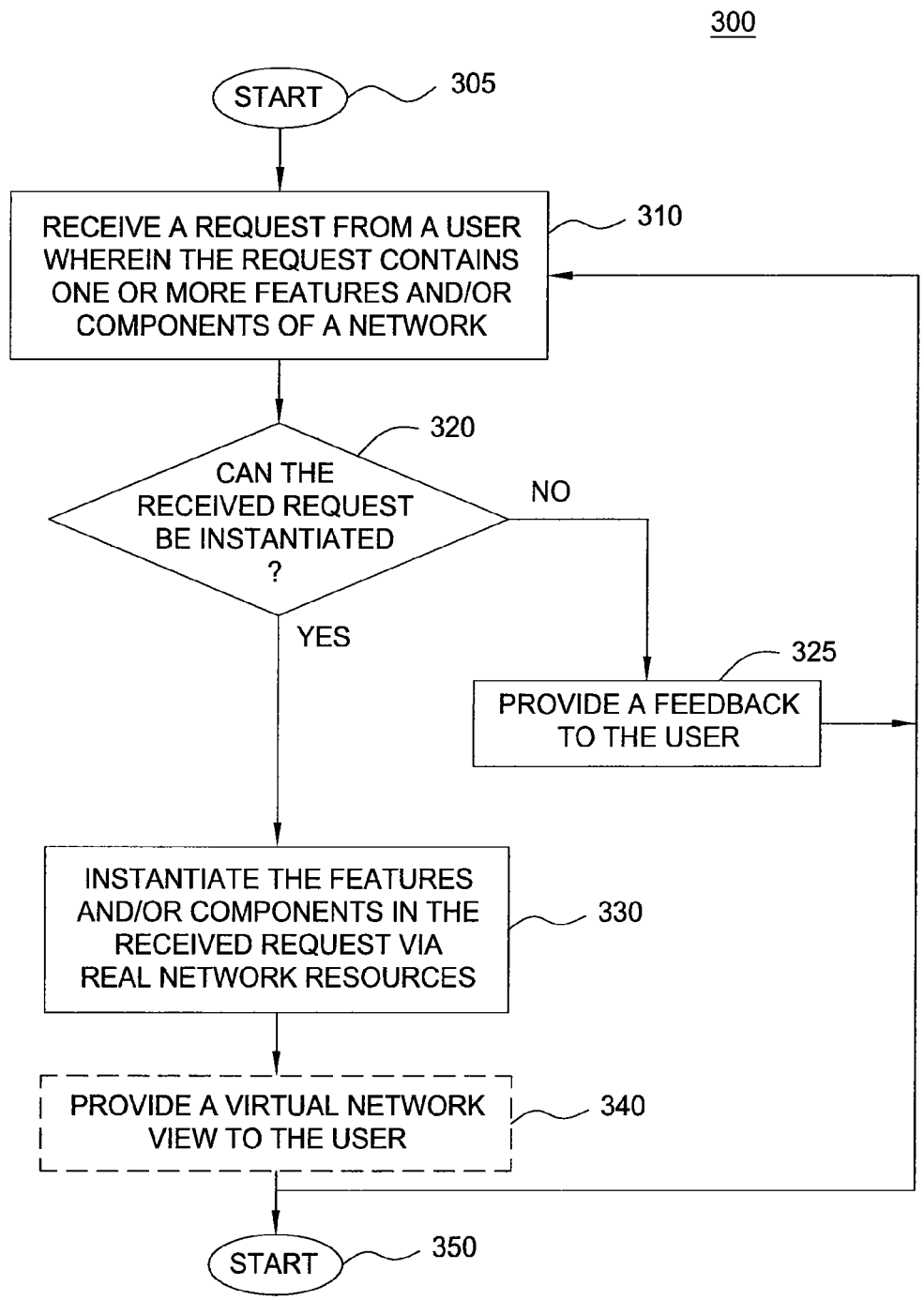
FIG. 3 illustrates a flowchart of a method for providing network virtualization.

FIG. 3 illustrates a flowchart of a method 300 for providing network virtualization. For example, one or more steps of method 300 can be implemented by an application server. Method 300 starts in step 305 and proceeds to step 310.

In step 310, method 300 receives a request from a user, wherein the request contains one or more features and/or components of a network. For example, the method may receive a user input that contains a draft virtual network design that a customer may wish to implement.

In step 320, method 300 determines if the received request can be instantiated. For example, the method may perform a lookup in a database to determine if a requested components and/or features can be emulated based on network resources or components of a real network. If the received request can be instantiated, the method proceeds to step 330. Otherwise, the method proceeds to step 325.

In step 325, method 300 provides a feedback to the user. For example, the method identifies features and/or components that may not be instantiated over the real network. The method then proceeds back to step 310.

In one embodiment, the feedback to the user may include alternatives to features and/or components that may not be instantiated. For example, a customer may have requested a router from a specific vendor that may not be emulated. However, the features may be available on another router that may be instantiated. The feedback may include a recommendation to implement the requested feature via an alternate router from another vendor.

In step 330, method 300 instantiates the features and/or components in the received request via real network resources. For example, the method provides the features of the virtual network over the real network components. The method then proceeds to optional step 340.

In optional step 340, method 300 may provide a virtual network view to the user. For example, the method may enable the customer to view the network via a user interface using components that may be only exist in the virtual network but not necessarily in the real network. The method then ends in step 350 or returns to step 310 to continue receiving requests.

It should be noted that although not specifically specified, one or more steps of method 300 may include a storing, displaying and/or outputting step as required for a particular application. In other words, any data, records, fields, and/or intermediate results discussed in the methods 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
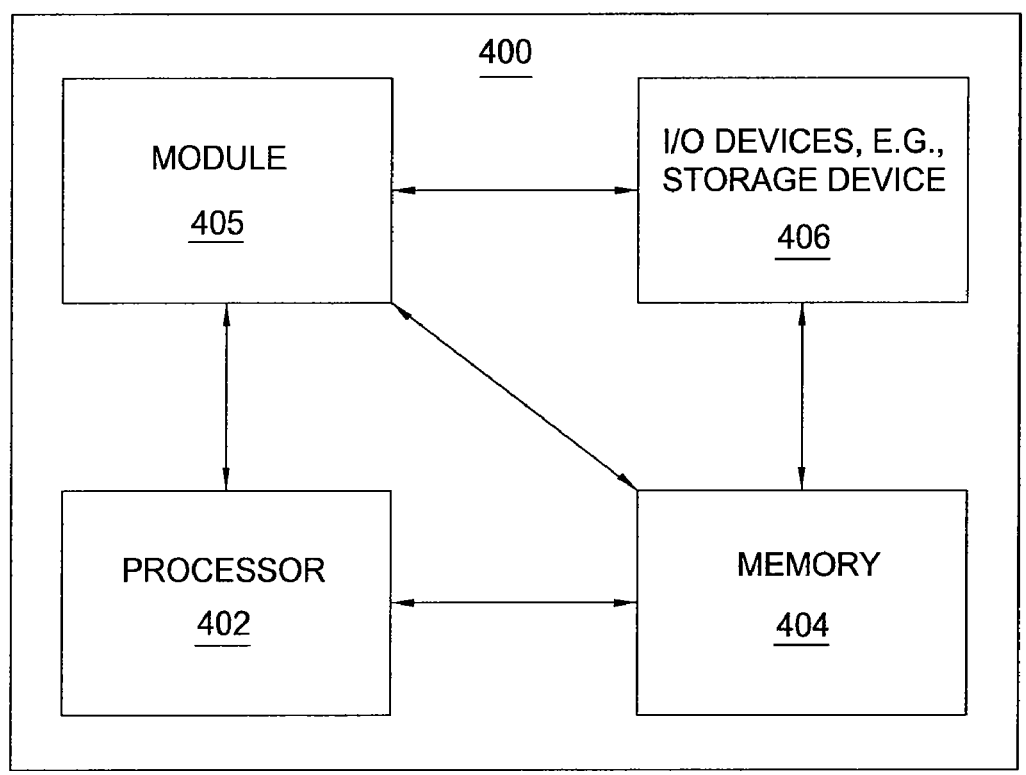
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing network virtualization, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing network virtualization can be loaded into memory 404 and executed by processor 402 to implement the functions as discussed above. As such, the present method 405 for providing network virtualization (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a network virtualization, comprising:
 receiving a request from a user, wherein the request comprises a network component for a virtual network, wherein the user is provided with a user interface for designing the virtual network, wherein the user interface allows the user to pin the network component of the virtual network to a real world topology;
 determining if the request is capable of being instantiated over a real network resource;
 instantiating the request via the real network resource, if it is determined that the request is capable of being instantiated; and
 providing a feedback to the user, wherein the feedback comprises an alternative to the network component if the network component is incapable of being instantiated.

2. The method of claim 1, wherein the virtual network spans over a data plane, a control plane and a management plane.

3. The method of claim 1, further comprising:
 providing a view of the virtual network consistent with the request to the user.

4. The method of claim 1, wherein the user interface further allows the user to pin the network component of the virtual network to a topology in cyberspace.

5. A computer-readable medium having stored thereon a plurality of instructions, the plurality of instructions including instructions which, when executed by a processor, cause the processor to perform a method for providing a network virtualization, comprising:
  receiving a request from a user, wherein the request comprises a network component for a virtual network, wherein the user is provided with a user interface for designing the virtual network, wherein the user interface allows the user to pin the network component of the virtual network to a real world topology;
  determining if the request is capable of being instantiated over a real network resource;
  instantiating the request via the real network resource, if it is determined that the request is capable of being instantiated; and
  providing a feedback to the user, wherein the feedback comprises an alternative to the network component if the network component is incapable of being instantiated.

6. The computer-readable medium of claim 5, wherein the virtual network spans over a data plane, a control plane and a management plane.

7. The computer-readable medium of claim 5, further comprising:
  providing a view of the virtual network consistent with the request to the user.

8. The computer-readable medium of claim 5, wherein the user interface further allows the user to pin the network component of the virtual network to a topology in cyberspace.

9. An apparatus for providing a network virtualization, comprising:
  a processor configured to:
    receive a request from a user, wherein the request comprises a network component for a virtual network, wherein the user is provided with a user interface for designing the virtual network, wherein the user interface allows the user to pin the network component of the virtual network to a real world topology;
    determine if the request is capable of being instantiated over a real network resource;
    instantiate the request via the real network resource, if it is determined that the request is capable of being instantiated; and
    provide a feedback to the user, wherein the feedback comprises an alternative to the network component if the network component is incapable of being instantiated.

10. The apparatus of claim 9, wherein the virtual network spans over a data plane, a control plane and a management plane.

11. The apparatus of claim 9, the processor is further configured to:
  provide a view of the virtual network consistent with the request to the user.

12. A method for providing a network virtualization, comprising:
  receiving a request from a user, wherein the request comprises a network component for a virtual network, wherein the user is provided with a user interface for designing the virtual network, wherein the user interface allows the user to pin the network component of the virtual network to a real world topology, wherein the request further comprises a link;
  determining if the request is capable of being instantiated over a real network resource;
  instantiating the request via the real network resource, if it is determined that the request is capable of being instantiated; and
  providing a feedback to the user, wherein the feedback comprises an alternative to the link, if the link is incapable of being instantiated.

13. A method for providing a network virtualization, comprising:
  receiving a request from a user, wherein the request comprises a network component for a virtual network, wherein the user is provided with a user interface for designing the virtual network, wherein the user interface allows the user to pin the network component of the virtual network to a real world topology, wherein the request further comprises a trunk;
  determining if the request is capable of being instantiated over a real network resource;
  instantiating the request via the real network resource, if it is determined that the request is capable of being instantiated; and
  providing a feedback to the user, wherein the feedback comprises an alternative to the trunk, if the trunk is incapable of being instantiated.

14. A method for providing a network virtualization, comprising:
  receiving a request from a user, wherein the request comprises a network component for a virtual network, wherein the user is provided with a user interface for designing the virtual network, wherein the user interface allows the user to pin the network component of the virtual network to a real world topology, wherein the request further comprises a feature of the network component;
  determining if the request is capable of being instantiated over a real network resource;
  instantiating the request via the real network resource, if it is determined that the request is capable of being instantiated; and
  providing a feedback to the user, wherein the feedback comprises an alternative to the feature of the network component, if the feature of the network component is incapable of being instantiated.

* * * * *